United States Patent

[11] 3,530,861

| [72] | Inventor | Margaret F. Carty<br>Plainfield, Vermont |
|---|---|---|
| [21] | Appl. No. | 750,842 |
| [22] | Filed | Aug. 7, 1968 |
| [45] | Patented | Sept. 29, 1970 |
| [73] | Assignee | The H-2-O Filter Corporation,<br>New York, New York<br>a corporation of New York |

[54] WATER-REACTIVE FILTER ELEMENT FOR SMOKING DEVICES AND MEANS FOR SECURING THE ASSEMBLY WITHIN THE HOUSING
3 Claims, 3 Drawing Figs.

| [52] | U.S. Cl. | 131/264, 131/10.1 |
| [51] | Int. Cl. | A24f 7/04, A24f 13/06, A24f 25/00 |
| [50] | Field of Search | 131/10.1, 9, 173, 261, 264 |

[56] References Cited
UNITED STATES PATENTS

| 2,755,206 | 7/1956 | Statia | 131/10.1 |
| 3,339,558 | 9/1967 | Waterbury | 131/10.1 |
| 3,366,121 | 1/1968 | Carty | 131/10.1 |
| 3,390,686 | 7/1968 | Irby et al | 131/10.1X |

*Primary Examiner*—Samuel Koren
*Assistant Examiner*—James H. Czerwonky
*Attorney*—M. Russell Dock

ABSTRACT: This invention relates to a filter for smoking articles such as cigarettes, cigars and pipes, wherein water container means, rupturable upon compression, are disposed within a resilient, waterproof housing. Smoke-permeable bodies are located at the opposite ends of the housing, and are retained within said housing by inwardly turned flanges on housing walls at both ends thereof. The flanges engage the bodies and retain them within the housing despite compression or distortion of the housing by squeezing.

Patented Sept. 29, 1970

3,530,861

INVENTOR
MARGARET F. CARTY

WATER-REACTIVE FILTER ELEMENT FOR SMOKING DEVICES AND MEANS FOR SECURING THE ASSEMBLY WITHIN THE HOUSING

The purpose of the present invention is to provide a filtering element for smoking articles such as cigarettes, cigars and pipes, wherein a resilient, waterproof housing containing frangible capsules having a water content and porous, smoke-permeable filtering material, has, at each end of said housing, an inwardly turned flange to prevent the said filtering material from being forced out of the housing upon compression thereof to rupture the capsules.

This invention constitutes an improvement over my U.S. Pat. No. 3,366,121, my co-pending patent application Ser. No. 662,920, filed Aug. 24, 1967, and my patent applications being filed concurrently herewith.

For an examination of the structure of this invention, reference is made to the drawings, in which.

Figure 1:
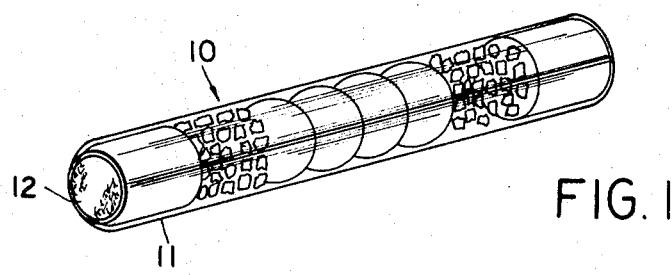
FIG. 1 is a perspective view of a filter element showing the flange at the end thereof.

Referring more particularly to the drawings, the filter unit 10 in FIG. 1 has a resilient, substantially transparent, waterproof housing 11, with a mass 12 of smoke-permeable porous material disposed within each end thereof.

Figure 2:
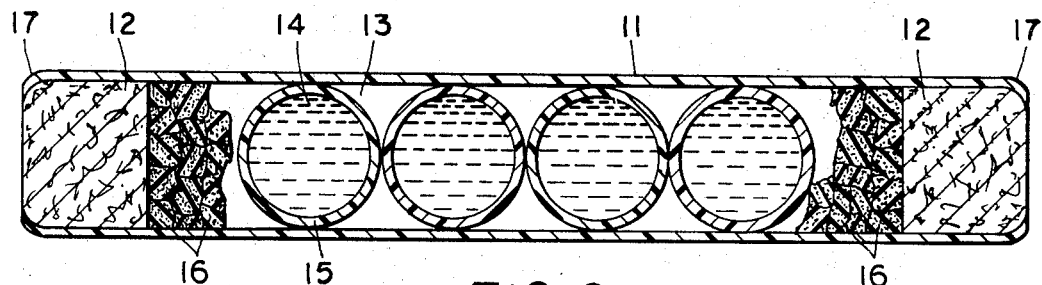
FIG. 2 is a cross section of a filter unit, showing said flanges at both ends of said housing.

In FIG. 2, housing 11 and masses 12, 12 combine to form a chamber 13 wherein water 14 is contained within rupturable capsules 15, and adjacent to said capsules, absorbent, expansible material 16; while at 17,17, said masses 12,12 are compressed at the outer ends of said housing, to prevent said masses from being forced out when the housing is squeezed or compressed to rupture the capsules.

Figure 3:
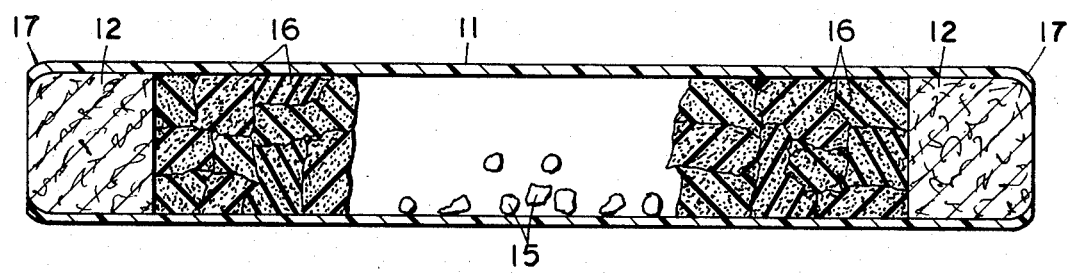
FIG. 3 is the cross section as in FIG. 2, showing the internal appearance of the unit after rupture of the capsules, and with the masses at the ends of the unit securely retained in place by said flange.

The effectiveness of said flanges in the housing at the ends thereof is demonstrated in FIG. 3, wherein fragments 15 of ruptured capsules are shown between expanded masses of absorbent material 16,16, with no ejection or displacement of masses 12,12.

The flange at both ends of the filter element provides for a secure retention of the masses of smoke-permeable material when the element is used in connection with a pipe. For such use, the element is accommodated within a chamber in the pipe stem provided therefor, and said element is compressed before insertion into said chamber, to rupture the capsules and release their contents. Smoke from the tobacco burning in the bowl of the pipe is drawn through the filter thus moistened, cooling the smoke and causing certain of the products of combustion to be retained in the filter material.

While this closure means is provided at both ends, it is possible to form the mouth end of the filter housing in this manner and to use a nominal diameter at the tobacco end thereof; however, such use would be impractical when the device is used with a pipe or in a cigarette or cigar holder, since the masses at both ends may be ejected upon compression of the unit to rupture the capsules. Likewise, it would be impractical to have a flange at only one end when the device is used as an integral attachment to a cigarette, because the use of automatic machinery to attach the filter to the cigarette makes it necessary that both ends be identical, so that either end may be attached to the tobacco portion of the cigarette and the opposite, or mouth, end will have the retaining means provided by the reduced diameter of the housing.

Such flanges may be achieved either by rolling, or shrinking, slotting, dimpling or cutting, or such other means as may be found convenient and suitable.

It is obvious that changes may be made in this invention within the scope of the appended claims without departing from the spirit of my invention.

I claim:

1. In a filter element for tobacco smoking devices having a housing comprising resilient, waterproof walls and a mass of smoke-permeable filtering material within each end thereof, and disposed therebetween, compressed absorbent sponge-like material and rupturable container means having a fluid content whereby, upon the rupture of said container means by squeezing said housing, the contents of said container means are released into and absorbed by said adjacent sponge-like material to cause the expansion thereof, the improvement consisting of said walls having inwardly directed flanges at the termini of said housing and engaging said smoke-permeable material, whereby the said smoke-permeable material is retained within said housing despite compression or distortion of the housing.

2. An invention as claimed in claim 1, wherein the flanges are formed by rolling.

3. An invention as claimed in claim 1, wherein the flanges are formed by shrinking.